United States Patent [19]

Takabayashi et al.

[11] Patent Number: 4,621,701

[45] Date of Patent: Nov. 11, 1986

[54] ELECTRIC POWER STEERING APPARATUS

[75] Inventors: Toshiyuki Takabayashi, Toyota; Tomio Yasuda, Kasukabe; Katsuhiro Sano, Toyota, all of Japan

[73] Assignee: Aisin Seiki Kabushiki Kaisha, Kariya, Japan

[21] Appl. No.: 713,542

[22] Filed: Mar. 19, 1985

[30] Foreign Application Priority Data

Mar. 23, 1984 [JP] Japan .................................. 59-56514

[51] Int. Cl.⁴ .............................................. B62D 5/04
[52] U.S. Cl. .................................. 180/79.1; 73/862.33
[58] Field of Search ...................... 180/79.1; 73/862.33

[56] References Cited

U.S. PATENT DOCUMENTS

| 2,551,742 | 5/1951 | Huebner et al. | 180/79.1 |
| 3,104,544 | 9/1963 | Guiot | 73/862.33 |
| 3,580,352 | 5/1971 | Hestad et al. | 73/862.33 |
| 4,522,278 | 6/1985 | Kitagawa et al. | 180/79.1 |

FOREIGN PATENT DOCUMENTS

| 57-190240 | 11/1982 | Japan . | |
| 58-177773 | 4/1983 | Japan | 180/79.1 |
| 58-194664 | 11/1983 | Japan | 180/79.1 |
| 2097131 | 10/1982 | United Kingdom | 180/79.1 |

Primary Examiner—John A. Pekar
Attorney, Agent, or Firm—Finnegan, Henderson, Farabow, Garrett & Dunner

[57] ABSTRACT

In an electric power steering apparatus including an input shaft, an output shaft and an electric motor for imparting a steering torque to the output shaft, a torque sensor includes a torsion bar provided between the input shaft and the output shaft. A movable member converts the output of the torsion bar into an axial movement of the same. The axial movement varies an electrostatic capacitance formed between an end of the movable member and an electrode plate held stationary, and the variation of the capacitance is utilized for controlling the electric motor in driving the output shaft.

14 Claims, 10 Drawing Figures

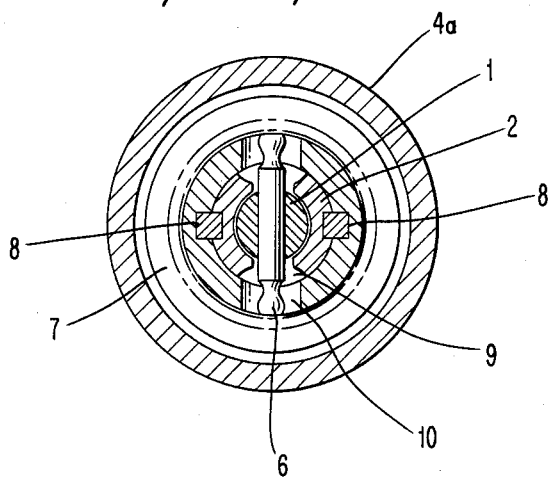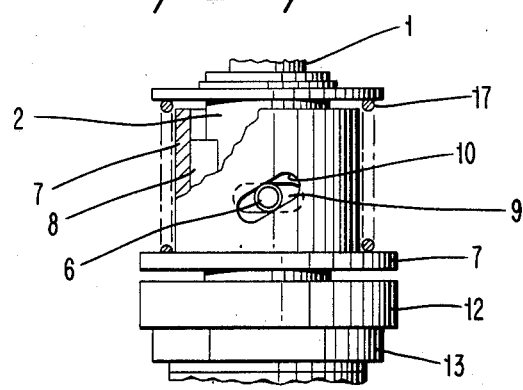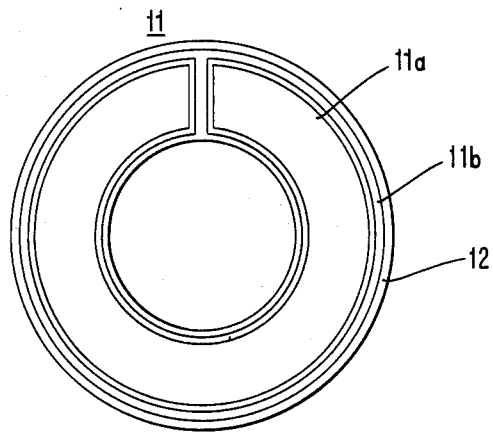

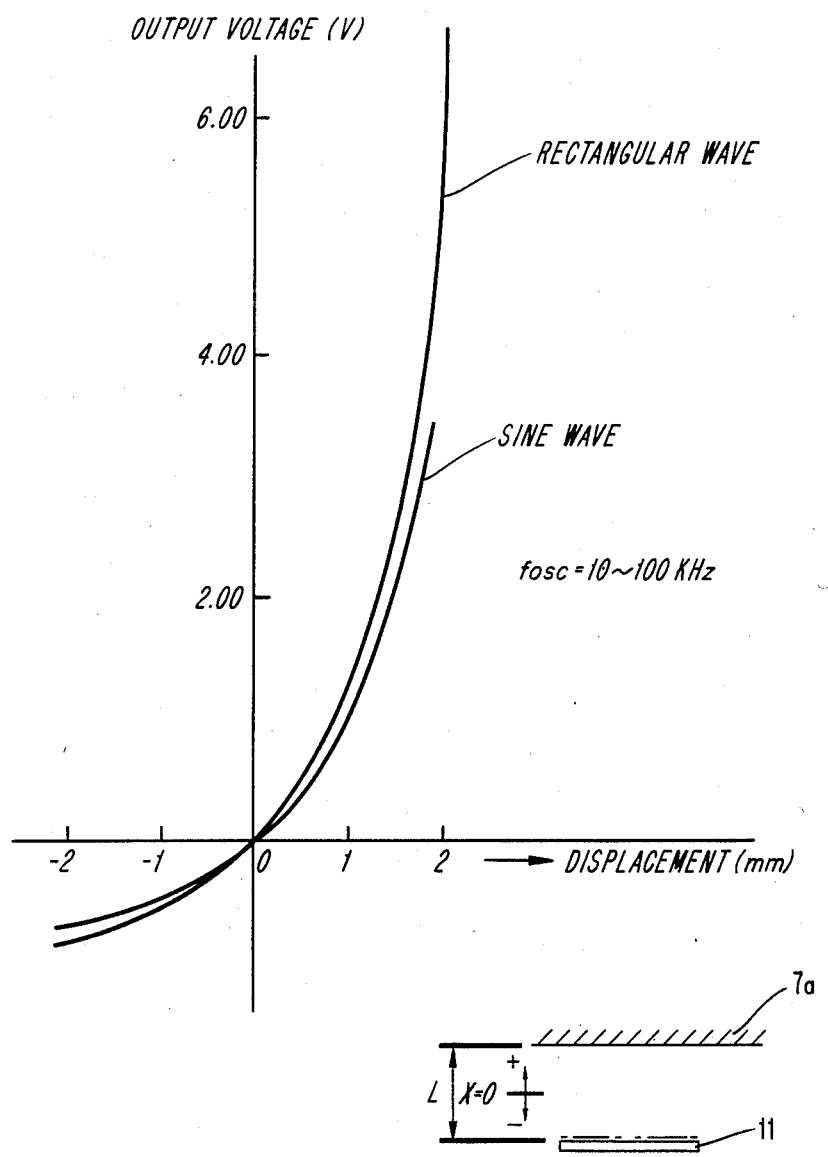

4,621,701

ELECTRIC POWER STEERING APPARATUS

BACKGROUND OF THE INVENTION

1. Field of the Invention

This invention relates to power steering apparatus, and more particularly to a type thereof in which a torque detecting device detects torque in a noncontacting manner by converting a twist of an angular deformation creating mechanism such as a torsion bar into a variation of an electric capacity.

2. Description of Prior Art

Heretofore power steering apparatus utilizing hydraulic, pneumatic and electric power have been widely known. However, on a vehicle such as an electric lift, electric motor car and the like wherein an electric motor is utilized as its prime-mover, electric steering apparatus is used advantageously for eliminating the installation of a hydraulic pump or else separately. For instance, Japanese Patent Laid-Open No. 190,240/1982 discloses a technique in which a member creating a relative displacement is provided between the input shaft and the output shaft of the power steering apparatus, and the relative displacement is detected from the excitation of an inductor. However, since the prior art utilizes a frequency near the resonant frequency of a tank circuit, a high precision frequency selectivity is required for the oscillator. Furthermore, a number of mechanical and electrical parts are used in the detector, and hence the assembling of the detector becomes troublesome. In addition, the detector has required frequent maintenance because of fatigue or else, thus restricting general use of the prior art apparatus for ordinary vehicles.

SUMMARY OF THE INVENTION

An object of the present invention is to provide an electric power steering apparatus wherein the above described disadvantages of the conventional techniques can be substantially eliminated.

Another object of the invention is to provide an electric power steering apparatus wherein the torque detecting device converts a torque into a variation of electrostatic capacity and detects the same in a manner hardly affected by the variation of oscillator frequency, so that the number of the parts can be substantially reduced as well as the possibility of fatigue or else, and a long operational life thereof is assured.

Additional objects and advantages of the present invention will be set forth in part in the description that follows and in part will be obvious from the description or may be learned by practice of the invention. The objects and advantages of the invention may be realized and obtained by the methods and apparatus particularly pointed out in the appended claims.

These and other objects of the invention can be achieved by an electric power steering apparatus comprising a housing, input and output shafts rotatably supported by the housing, a torque sensor for sensing a torque applied to the input shaft, and an electric motor imparting a torque to the output shaft in accordance with the output of the torque sensor, the aforementioned torque sensor comprising an angular displacement creating mechanism disposed between the input shaft and the output shaft for creating an angular displacement depending on a torque applied to the input shaft, a projecting member secured to either one of the two shafts so as to extend in a radial direction of the one shaft, a movable member which is provided with a helically extending oblique surface slidingly engageable with the projecting member so that the movable member is displaced along the axis of the other one of the two shafts in accordance with the angular displacement created by the mechanism, and an electrode plate secured to the housing for providing an electrostatic capacity therebetween, so that the torque sensor is permitted to detect the torque applied to the input shaft based on the electrostatic capacity.

The accompanying drawings, which are incorporated in and constitute a part of this specification, illustrate presently preferred embodiments of the invention and, together, with the description, serve to explain the principles of the invention.

BRIEF DESCRIPTION OF THE DRAWINGS

In the accompanying drawings:

FIG. 2 is a sectional view along the line A—A in FIG. 1;

FIG. 3 is a front view of important parts provided in the vicinity of the line A—A in FIG. 1;

FIG. 4 is a plan view showing a pattern of an electrode plate;

FIG. 5 is a graphical representation of displacement-electrostatic capacity charcteristics of this embodiment;

DESCRIPTION OF THE PREFERRED EMBODIMENTS

Figure 1:
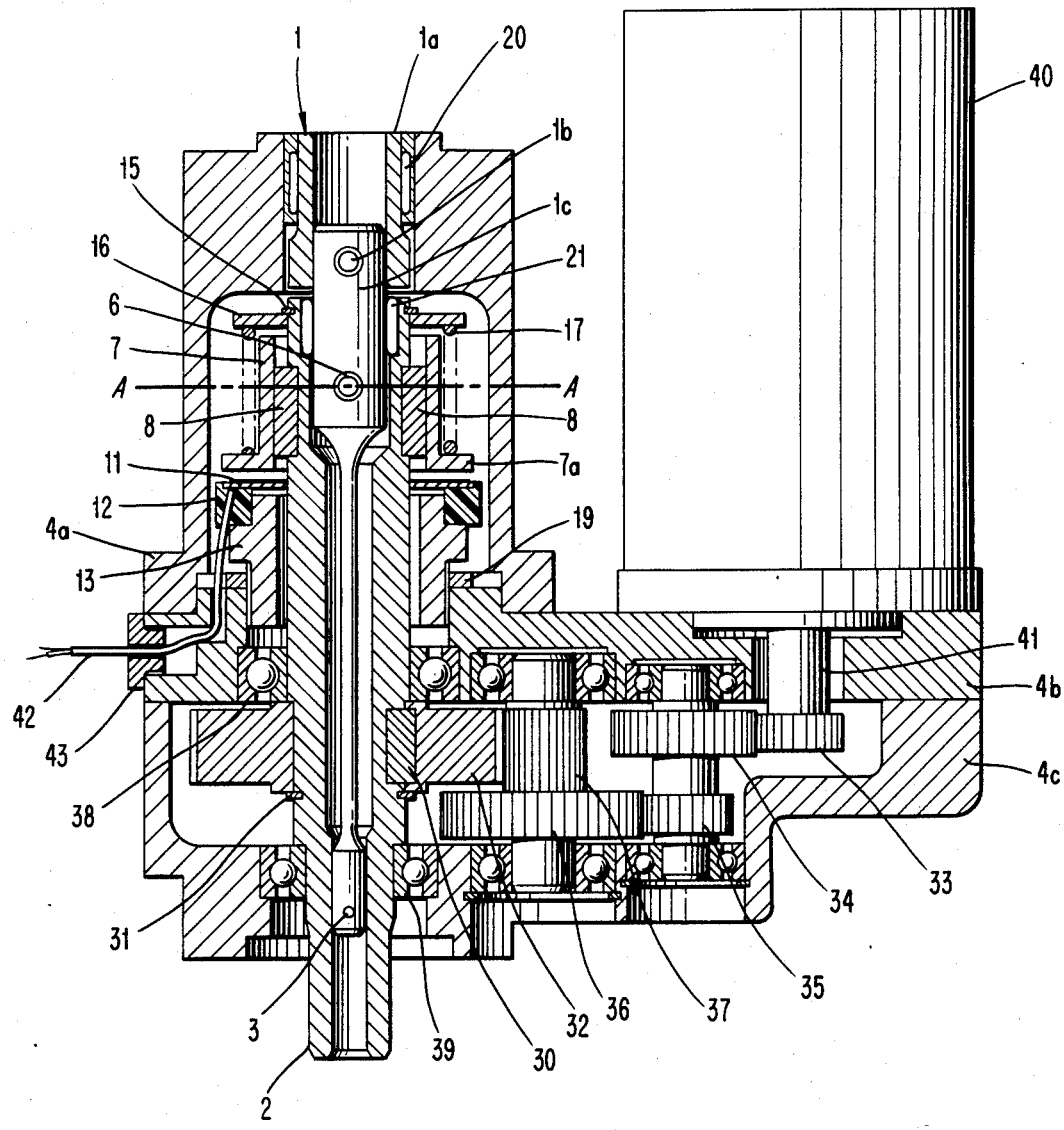
FIG. 1 is a sectional view showing a torque sensor and related parts included in a preferred embodiment of the invention.

Reference will now be made in detail to a presently preferred embodiment of the invention, an example of which is illustrated in the accompanying drawings. Throughout the drawings, like reference characters are used to designate like elements.

Referring now to FIGS. 1, 2 and 3, there are illustrated a torque sensor and related parts included in a preferred embodiment of the present invention. The torque sensor has an input shaft 1 outwardly connected through a steering shaft to a steering handle (not shown), and an output shaft 2 outwardly connected to steering gears (not shown). The input shaft 1 comprises a hollow cylindrical portion 1a and a torsion bar 1c. Splines are formed along the internal surface of the holow cylindrical portion 1a. The torsion bar 1c is upwardly inserted into the hollow cylindrical portion 1a and secured therein by means of a pin 1b. The input shaft 1 may otherwise be provided integrally with the steering shaft (not shown). The torsion bar 1c is secured at a lower end thereof to the output shaft 2 by means of a pin 3. A pin 6 is inserted at a position spaced apart from the pin 3 by a predetermined distance. The aforementioned pin 6 engages with elongated holes 9 and 10 formed through the output shaft 2 and a movable member 7, respectively. By means of keys 8, the movable member 7 is removably vertically along the axial direction of the input shaft 1 and output shaft 2. A coil spring 17 is provided between a securing plate 16 that is secured to an upper part of the output shaft 2 by a snap ring 15 and a flange portion 7a of the movable member 7. By the force of the coil spring 17, the pin 6 is urged to the upper side of the elongated hole 10 of the movable member 7 in case where the coil spring 17 is a compression spring. In case where the coil spring 17 is a tension spring, the pin 6 is urged to the lower side surface of the elongated hole 10. Although in the above described embodiment, the surface to which the pin is urged has been described to be upper or lower surface of the elongated hole 10, the hole 10 may otherwise be replaced by a cut-away portion having an oblique surface on a side thereof depending on the direction of the spring force applied to the movable member 7. The material, diameter and the length of the input shaft between the pin 3 and pin 6 are so selected that a torsional resilience force of a suitable value is thereby provided within the range of the elasticity. More specifically, the portion of the input shaft 1 forming the torsion bar 1c is reduced in diameter, and the length between the pin 3 and pin 6 is set to a predetermined length. Opposing to the flange portion 7a of the movable member 7, there is provided an electrode plate 11 secured to a stationary member 12 made of an insulating material. The stationary member 12 is held its position by means of an electrode setting member 13 engaging with the housing 4b in a screw-threaded manner. After a screw engaged position has been determined, the stationary member 12 is secured to the position by means of a lock nut 19 or an adhesive agent. The electrode plate 11 has an electrode portion 11a and a shielding electrode portion 11b both formed on an insulating substrate as shown in FIG. 4.

The flange portion 7a of the movable member 7 is disposed in parallel with the upper surface of the electrode plate 11, and since an electrode shielding portion 11b is provided around the electrode portion 11a as described above, it is apparent theoretically that the frequency characteristic of the sensor would be satisfactory. Actual measurement exhibits displacement-capacity characteristics as shown in FIG. 5. In the characteristics, no recognizable deviation is exhibited for signals of various frequencies where the wave shape thereof is of a similar kind, while a slight deviation is exhibited for the signals of different wave shapes. Lead wires 42 connected to the electrode portions 11a and 11b are provided to extend outside through a sealing block 43. The torque sensor of the above described construction is encased in a housing 4a secured to the housing 4b. A bearing 20 is provided between the input shaft 1 and the housing 4a.

A mechanism for transmitting torque of a motor 40 is constructed as follows.

By means of a key 30 and a snap ring 31, an output gear 32 is secured to the output shaft 2. The output gear 32 is coupled through a required number of gears 34-37 to a gear 32 secured to or formed integral with a motor shaft 41. The torque of the motor 40 is thus transmitted from the gear 33 on the motor shaft 41 to the output gear 32 on the output shaft 2 through a reduction gear train 34-37. The gears 34-37 are supported by the housings 4b and 4c through bearings and snap springs of a required number. On the other hand, the output shaft 2 is supported from the housing 4b and 4c through bearings 38 and 39 provided respectively. In the above described embodiment, although the motor shaft 41 is disposed in parallel with the output shaft 2 in a compact manner, if a reduction of the transmission efficiency is allowed, the output shaft 2 and the motor shaft 41 may be coupled through a worm-gear mechanism.

The operation of the torque sensor will now be described in detail.

The input shaft 1 and the output shaft 2 are coupled together through the pin 3 so that no relative displacement is allowed in the axial direction and the rotating direction. Likewise, the axial displacement of the output shaft 2 relative to the housings is restricted by the bearings 38 and 39, while the axial displacement of the input shaft 1 is restricted by the bearing 20. Furthermore, the bearing 21 is provided between the end portions of the input shaft 1 and the output shaft 2. Accordingly, although the axial displacement of the input shaft 1 is restricted, the rotational movement thereof is not restricted. Furthermore, the relative movement in the rotating direction between the end portions at the bearing 21 is not restricted although the axial displacement thereof is restricted. The pin 6 extends radially outwardly through the elongated hole 9 formed through the output shaft 2, as shown in FIG. 2, so that the relative displacement in the rotating direction, between the input shaft 1 and the output shaft 2 is permitted in a range defined by the elongated hole 9. The pin 6 may be formed to restrict the axial displacement between the two shafts.

With the above described arrangement, a torsional movement of the input shaft 1 around the position of the pin 3 is permitted upon application of a torque to the input shaft 1, and so-called torsion-bar mechanism is thereby realized. Although in the present embodiment, the input shaft 1 is extended through the internal bore of the output shaft 2, it is apparent that the relation may otherwise be reversed such that the output shaft 2 extends through the internal bore of the input shaft 1 so far as the torsion-bar mechanism is maintained therebetween. According to the above described operation of the mechanism, the pin 6 moving along the elongated hole 10 of the movable member 7 converts an angular displacement of the torsion bar into an axial displacement of the movable member 7.

Figure 6A:
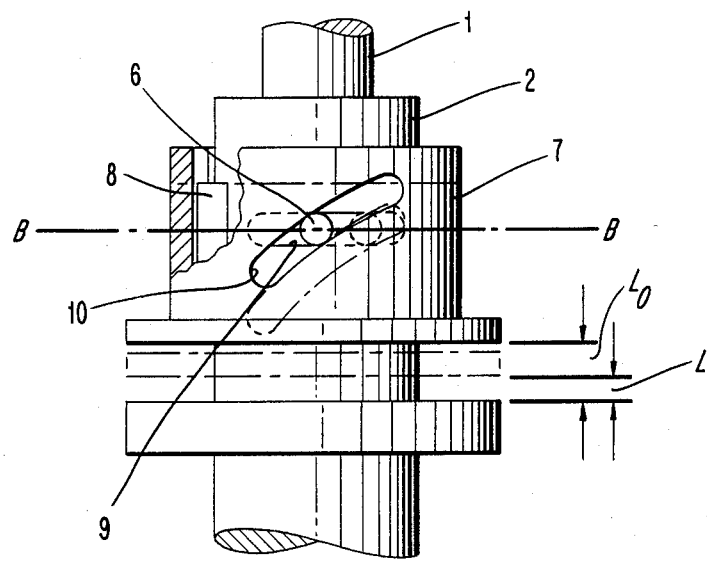
FIG. 6(a) is a front view showing another embodiment of the torque sensor.
Figure 6B:
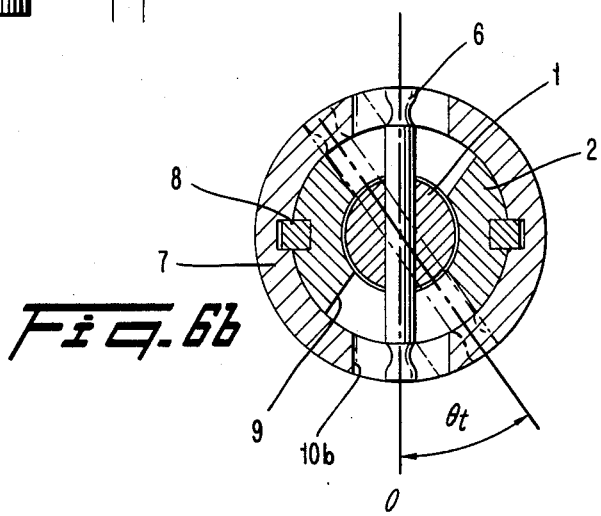
FIG. 6(b) is a sectional view along the line B—B in FIG. 6(a)

The relative movement between the pin 6 and the elongated hole 10 of the movable member 7 during the torsion-bar operation will be further described with reference to FIG. 6(a) showing the torque sensor and FIG. 6(b) showing a section along the line B—B in FIG. 6(a).

An electrostatic capacitance $C_x$ provided between the flange portion 7a of the movable member 7 and the electrode plate 11 varies in accordance with the distance L between the portion 7a and the plate 11 as follows.

$$C_x = K_1 \cdot (1/L) \quad (1)$$

wherein $K_1$ is a constant.

That is, the capacitance $C_x$ is varied in reverse proportion to the distance L. On the other hand, the angular displacement $\theta_t$ of the torsion bar 1a is varied by the torsion spplied to the same as follows.

$$T = K_t \theta_t \quad (2)$$

wherein T represents the torque, and $K_t$ is a constant. In order to establish a linear relation between the capacitance $C_x$ and the input torque T, following relation must be provided.

$$C_x = K_2 T + C_o \quad (3)$$

wherein $K_2$ is a constant and
$C_o$ is a capacitance at a neutral position of the flange. From the equations (1), (2) and (3)

$$L = K_1/\{(K_r K_t K_2 \cdot \theta_t) + C_o\} \quad (4)$$

that is, $$L = K_1/(K_o \cdot \theta_t + C_o) \quad (5)$$

wherein K and $K_o$ are constants.

Accordingly, if the pin 6 abuts against an oblique surface, thereby causing a displacement of the movable member following the equation (5), the capacitance $C_x$ obtained between the flange portion 7a of the movable member 7 and the electrode plate 11 varies in a linear manner. The problems of abruptly varying an output voltage V for a slight variation of the input torque T, and of causing a slight variation of the output against a large variation of the input torque T can be eliminated, and accurate sensing with least error can be thereby realized.

Figure 7:
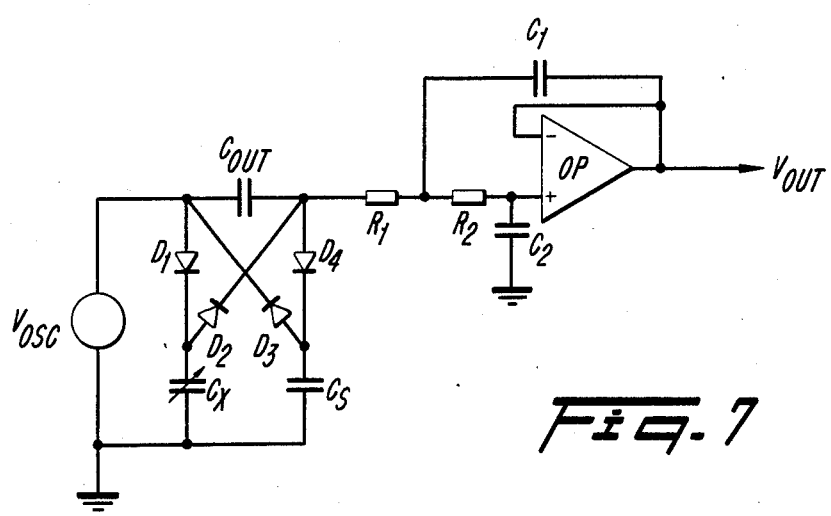
FIG. 7 is an electric circuit diagram used with the torque sensor.

FIG. 7 illustrates an electric circuit used with the above described embodiment of the torque sensor. An oscillator $V_{osc}$ produces an output signal of a positive and negative going waveform. The output signal charges the capacitor $C_x$ formed between the flange portion 7a of the movable member 7 and the electrode plate 11 and a reference capacitor $C_s$ through diodes $D_1$ and $D_3$. The capacitors $C_x$ and $C_s$ thus charged in turn charge an output capacitor $C_{out}$ through diodes $D_2$ and $D_4$. Since the polarity of the capacitor $C_x$ is reverse to that of the capacitor $c_s$, the output capacitor $C_{out}$ is charged by the difference between the voltages of the capacitors $C_x$ and $C_s$. The voltage of the capacitor $C_{out}$ is applied to a low-pass filter which includes an operational amplifier OP operable as a buffer amplifier. The output of the low-pass filter provides the output of the torque sensor which converts a variation of an electrostatic capacitance into a voltage difference.

With the above described construction and arrangement of the torque sensor, however, the electrostatic capacitance expressed by the equation (1) is affected by the dielectric constant of the atmosphere between the flange portion 7a and the electrode plate 11. Such a disadvantage can be eliminated in the embodiment shown in FIG. 8. In this embodiment, an additional electrode setting member 50 is provided at a position opposing to the upper surface of the flange portion 7a of the movable member 7. A second electrode plate 51 is provided on the lower surface of the additional electrode setting member 50 facing the upper surface of the flange portion 7a. The additional electrode setting member 50 is in a screw-thread engagement with the electrode setting member 13 so that the position of the member 50 is made adjustable relative to the member 13. After adjustment, the additional electrode setting member 50 is set to the position by means of a lock nut 52. By the above described arrangement, another electrostatic capacitance is provided between the second electrode plate 51 and the upper surface of the flange portion 7a, and by detecting a ratio between the capacitance $C_x$ and the additionally provided capacitance, the disadvantageous effect of the dielectric constant can be eliminated.

Figure 8:
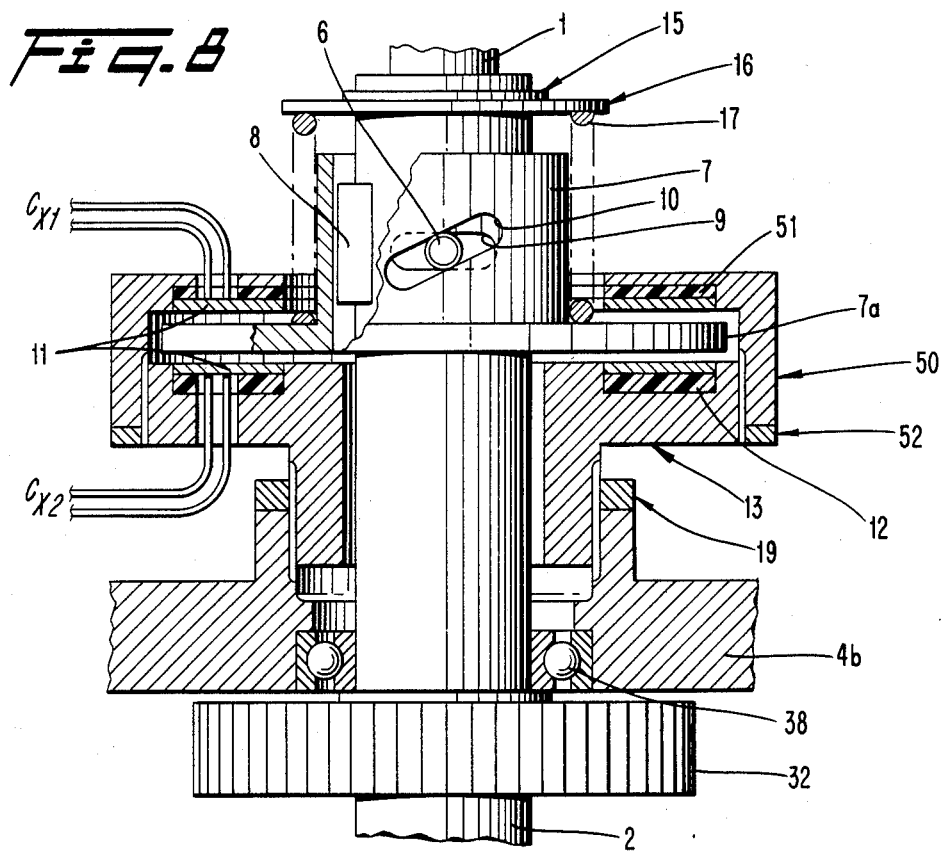
FIG. 8 is a sectional view showing still another embodiment of the torque sensor.
Figure 9:
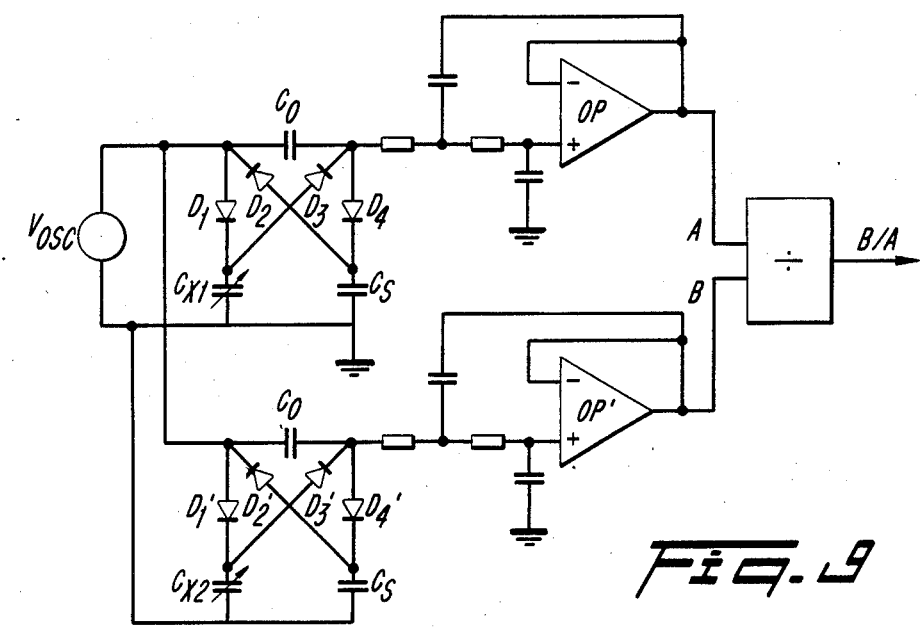
FIG. 9 is an electric circuit diagram used with the embodiment shown in FIG. 8.

FIG. 9 illustrates an electric circuit to be used with the embodiment shown in FIG. 8. In the circuit, capacitors $C_{x1}$ and $C_{x2}$ formed between the lower surface of the flange 7a and the electrode plate 11 and between the second electrode plate 51 and the upper surface of the flange 7a, respectively, are utilized instead of the capacitor $C_x$ in FIG. 7. The outputs of low-pass filters delivered corresponding to the variations of the capacitors $C_{x1}$ and $C_{x2}$ are applied to a division circuit for determining the ratio between the variations of the capacitances of the capacitors $C_{x1}$ and $C_{x2}$.

According to the present invention, an angular displacement between the input shaft 1 and the output shaft 2 of the torque sensor caused by applying a torque to the input shaft 1 is converted by the aid of an oblique surface into an axial displacement of the movable member. Selecting the movable member as an earth electrode, a voltage signal is applied across a capacitor formed between the earth electrode and the electrode plate for detecting the variation of the capacitance. In this case, a lead wire is connected to the electrode plate provided on a statioary member. As a consequence, the lead wire is also held stationary and a fatique tending to occur in the lead wire can be substantially reduced. Furthermore, since a variation of stray capacitance caused by the displacement of the lead wire can be eliminated, the sensing error of the torque sensor can be substantially reduced.

Axial displacement of the movable member 7 caused by the angular displacement of the torsion bar selected to be $$K/(K_o \cdot \theta_t + C_o)$$

wherein K and $K_o$ are constants, $\theta_t$ represents angular displacement, and $C_o$ represents a capacitance at the neutral position of the movable member, the variation of the capacitance is made proportional to the angular displacement of the torsion bar. Thus, the problem of causing an abrupt variation of the output voltage despite of a slight variation of the input torque T, or causing only a slight variation of the output voltage despite of a large variation of the input torque T can be eliminated, and the detecting error of the electrostatic capacitance can be minimized.

Since an angular displacement of the torsion bar caused by the application of a torque to the input shaft is converted by the aid of an oblique surface into an axial displacement of the movable member, and the input torque applied to the input shaft is detected from the axial displacement of the movable member, the size of the torque sensor can be economized. Furthermore, since the torque detecting portion is formed by an inserted portion of the input shaft into the output shaft, no additional space is required for the torque detecting portion. Since the driving shaft of the motor is disposed in parallel with the output shaft, the size of the driving mechanism of the output shaft can be reduced. The motor and the output shaft are mounted on the same housing, so that the assembling of the electric power steering apparatus can be simplified. In case where the capacitors are provided on both sides of the flange portion of the movable member, the variation of the electrostatic capacitance can be detected without being affected by the variation of the dielectric constant.

It will be apparent to those skilled in the art that modifications and variations can be made in the power steering apparatus of this invention. The invention in its broader aspects is, therefore, not limited to the specific details, representative methods and apparatus, and illustrative examples shown and described herein above. Thus, it is intended that all matter contained in the foregoing description or shown in the accompanying drawings shall be interpreted as illustrative and not in a limiting sense.

What is claimed is:

1. An electric power steering apparatus comprising:
a housing;
input and output shafts rotatably supported by said housing;
a torque sensor for sensing torque applied to said input shaft, said sensor including angular displacement means disposed between said input and output shafts for angularly displacing said input and output shafts a distance relative to one another in accordance with said applied torque, a member mounted in said housing to be movable axially of said input and output shafts, said movable member having a radially extending surface, an electrode plate secured to said housing, said plate having a radially extending electrode surface spaced from, parallel to, and opposing said radial surface of said movable member, and axial displacement means including said movable member and one of said input and output shafts, said axial displacement means responsive to said angular displacing of said input and output shafts for varying the axial position of said movable member in order to vary the electrostatic capacity of said electrode plate in accordance with the axial distance between said opposing spaced surfaces;
circuit means connected to said electrode plate to generate an output having a value in accordance with said electrostatic capacity; and
an electric motor means for impairing a torque to said output shaft in accordance with the output of said circuit means.

2. An electric power steering apparatus as set forth in claim 1 wherein said axial displacement means includes a radially extending projecting member connected to one of said shafts, and a helically extending oblique surface slidingly engageable with said projecting member, said oblique surface being positioned such that said movable member is thereby displaced axially in response to the angular displacing of said input shaft and output shaft for a distance of $$K/(K_o \cdot \theta_t + C_o)$$

wherein:
K and $K_o$ are constants,
$\theta_t$ represents the angular displacement, and
$C_o$ represents an electrostatic capacitance present in the absence of said displacement of said movable member.

3. An electric power steering apparatus as set forth in claim 2 wherein said angular displacement means comprises a torsion bar having one end secured to said input shaft and an opposite end secured to said output shaft.

4. An electric power steering apparatus as set forth in claim 1 wherein said angular displacement means comprises a torsion bar having one end secured to said input shaft and an opposite end secured to said output shaft.

5. An electric power steering apparatus as set forth in claim 1 wherein said radially extending surface of said movable member is an annular flange portion at an end thereof, and said electrode surface of said electrode plate is substantially coextensive with said flange portion.

6. An electric power steering apparatus as set forth in claim 1 wherein said electric motor has an output shaft disposed in parallel with said output shaft, and is coupled with said output shaft through a train of speed reduction gears.

7. An electric power steering apparatus according to claim 1 wherein said radially extending surface of said movable member and said radially extending electrode surface are perpendicular to the axis of one of said shafts.

8. An electric power steering apparatus comprising:
a housing;
input and output shafts rotatably supported by said housing;
a torque sensor for sensing torque applied to said input shaft, said sensor including angular displacement means disposed between said input and output shafts for angularly displacing said input and output shafts a distance relative to one another in accordance with said applied torque, a member mounted in said housing to be movable axially of said input and output shafts, said movable member having first and second radially extending surfaces, a first electrode plate secured to said housing, said first plate having a radially extending electrode surface spaced from, parallel to, and opposing said first radial surface of said movable member, a second electrode plate secured to said housing, said second plate having a radially extending electrode surface spaced from, parallel to, and opposing said second radial surface of said movable member, axial displacement means including said member and one of said input and output shafts, said axial displacement means responsive to said angular displacing of said input and output shafts for varying the axial position of said movable member in order to vary the electrostatic capacity of said electrode plates in accordance with the axial distance between said respective opposing spaced surfaces;
circuit means connected to said electrode plates to generate an output having a value in accordance with said electrostatic capacities; and
an electric motor means for imparting a torque to said output shaft in accordance with the output of said circuit means.

9. An electric power steering apparatus as set forth in claim 8 wherein said radially extending surfaces of said movable member are on a flange portion of said movable member, said first and second radially extending surfaces are located on opposite sides of said flange portion, and wherein said circuit means includes means for detecting the ratio between electrostatic capacitances obtained between said two electrode plates and said flange portion.

10. An electric power steering apparatus comprising:
a housing;
input and output shafts rotatably supported by said housing;
a torque sensor for sensing torque applied to said input shaft, said sensor including angular displacement means disposed between said input and output shafts for angularly displacing said input and output shafts a distance relative to one another in accordance with said applied torque, a member mounted in said housing to be movable axially of said input and output shafts, said movable member having a radially extending surface, an electrode plate secured to said housing, said electrode plate being supported by an electrode setting member which is secured to said housing in a screw-thread engagement such that the position thereof is adjustable relative to said housing, said plate having a radially extending electrode surface spaced from, parallel to, and opposing said radial surface of said movable member, a radially extending projecting member connected to one of said shafts, and a helically extending oblique surface on said movable member, said oblique surface being slidingly engageable with said projecting member and positioned such that said movable member is thereby displaced axially in response to the angular displacing of said input and output shafts in order to vary the electrostatic capacity of said electrode plate in accordance with the axial distance between said opposing spaced surfaces;

circuit means connected to said electrode plate to generate an output having a value in accordance with said electrostatic capacity; and an electric motor means for imparting a torque to said output shaft in accordance with the output of said circuit means.

11. An electric power steering apparatus comprising:

a housing;

input and output shafts rotatably supported by said housing;

a torque sensor for sensing torque applied to said input shaft, said sensor including angular displacement means disposed between said input and output shafts for angularly displacing said input and output shafts a distance relative to one another in accordance with said applied torque, a member mounted on said housing to be movable axially of said input and output shafts, said movable member having a radially extending surface, an electrode plate secured to said housing, said plate having a radially extending electrode surface spaced from, parallel to, and opposing said radial surface of said movable member, a radially extending pin connected to one of said shafts, a helically extending elongated hole slidingly engageable with said pin, said elongated hole positioned such that said movable member is thereby displaced along the axis of the other of said two shafts in response to the angular displacing of said input shaft and output shaft in order to vary the electrostatic capacity of said electrode plate in accordance with the axial distance between said opposing spaced surfaces;

circuit means connected to said electrode plate to generate an output having a value in accordance with said electrostatic capacity; and an electric motor means for imparting a torque to said shaft in accordance with the output of said circuit means.

12. An electric power steering apparatus as set forth in claim 11 wherein said elongated hole is formed in said movable member such that said movable member is thereby displaced axially in response to the angular displacement for a distance of $$K/(K_o \cdot \theta_t + C_o)$$

wherein:

K and $K_o$ are constants, $\theta_t$ represents the angular displacement, and $C_o$ represents an electrostatic capacitance present in the absence of axial displacement of said movable member.

13. An electric power steering apparatus as set forth in claim 11 wherein said input shaft and output shaft are arranged coaxially, said pin is secured to said input shaft, said movable member has a tubular configuration and is arranged around an end of said output shaft combined with said input shaft such that said movable member is slidingly movable along the axis of said output shaft but is rotatable with said output shaft, said input shaft is inserted into an inner bore of said output shaft so as to be rotatable relative to said output shaft, said torque sensor includes a torsion bar having an end secured to said input shaft and the other end secured to said output shaft, said bar being in said inner bore of said output shaft, a tubular electrode setting member disposed around said output shaft in threaded engagement with said housing for adjustably positioning said electrode plate relative to said housing, said electrode plate is supported by said electrode setting member to be held in opposition to said radially extending surface, and said axial displacement means includes a coil compression spring interposed between said radially extending surface and a retainer supported by said output shaft on said movable member near the input shaft for urging said movable member toward said electrode plate.

14. An electric power steering apparatus as set forth in claim 13 wherein said electric motor means includes a motor having a driving shaft in parallel with said output shaft, and a speed reduction gear train coupling said driving shaft and said output shaft.

* * * * *